(12) United States Patent
Hofer

(10) Patent No.: US 10,661,647 B2
(45) Date of Patent: May 26, 2020

(54) VEHICLE WITH SUPPORTING STRUCTURE

(71) Applicant: MAGNA STEYR Fahrzeugtechnik AG & Co KG, Graz (AT)

(72) Inventor: Bernhard Hofer, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 16/247,713

(22) Filed: Jan. 15, 2019

(65) Prior Publication Data

US 2019/0217695 A1     Jul. 18, 2019

(30) Foreign Application Priority Data

Jan. 15, 2018    (EP) ..................... 18151638

(51) Int. Cl.
    *B60K 1/04*      (2019.01)
    *B62D 25/20*      (2006.01)
    *H01M 2/04*      (2006.01)
    *H01M 2/10*      (2006.01)

(52) U.S. Cl.
    CPC ............... *B60K 1/04* (2013.01); *B62D 25/20* (2013.01); *H01M 2/043* (2013.01); *H01M 2/1083* (2013.01); *B60K 2001/0438* (2013.01); *B60K 2001/0472* (2013.01)

(58) Field of Classification Search
    CPC ............... B60K 2001/0438; B60K 2001/0472
    USPC ....................................................... 180/68.5
    See application file for complete search history.

(56) References Cited

U.S. PATENT DOCUMENTS

| | | | | |
|---|---|---|---|---|
| 4,365,681 | A * | 12/1982 | Singh ............. | B60K 1/04 180/68.5 |
| 5,390,754 | A * | 2/1995 | Masuyama ....... | B60K 1/04 180/68.5 |
| 5,501,289 | A * | 3/1996 | Nishikawa ....... | B60K 1/04 180/68.5 |
| 5,620,057 | A * | 4/1997 | Klemen ........... | B60K 1/04 180/65.1 |
| 5,639,571 | A * | 6/1997 | Waters ............. | H01M 2/1083 429/71 |
| 6,227,322 | B1 * | 5/2001 | Nishikawa ....... | B60R 16/04 180/65.1 |
| 6,631,775 | B1 * | 10/2003 | Chaney ............ | B60L 50/66 180/68.5 |
| 6,632,560 | B1 * | 10/2003 | Zhou ............... | H01M 2/1083 180/68.5 |
| 7,993,155 | B2 * | 8/2011 | Heichal ........... | B60K 1/04 439/374 |

(Continued)

FOREIGN PATENT DOCUMENTS

| | | |
|---|---|---|
| DE | 102015205413 A1 | 9/2016 |
| EP | 2982579 A1 | 2/2016 |
| JP | 2014031168 A | 2/2014 |

*Primary Examiner* — Jeffrey J Restifo

(74) *Attorney, Agent, or Firm* — Jordan IP Law, LLC; Todd A. Vaughn

(57) ABSTRACT

A motor vehicle that includes a body having a support structure, a high-voltage battery having a battery housing and at least one battery module arranged in the battery housing. The battery housing is arranged on and attached to the support structure to serve as a main floor panel. A battery cover is detachably arranged on the underside of the battery housing to serve as underride protection and facilitate access to the at least one battery module.

16 Claims, 4 Drawing Sheets

(56) References Cited

U.S. PATENT DOCUMENTS

| | | | | |
|---|---|---|---|---|
| 7,997,368 B2 * | 8/2011 | Takasaki | | B60K 1/04 180/68.5 |
| 8,006,793 B2 * | 8/2011 | Heichal | | B60K 1/04 180/68.5 |
| 8,079,435 B2 * | 12/2011 | Takasaki | | B60K 1/04 180/68.5 |
| 8,146,694 B2 * | 4/2012 | Hamidi | | B60K 1/04 180/68.5 |
| 8,210,301 B2 * | 7/2012 | Hashimoto | | B60K 1/04 180/68.5 |
| 8,268,469 B2 * | 9/2012 | Hermann | | H01M 2/1077 429/62 |
| 8,286,743 B2 * | 10/2012 | Rawlinson | | F41H 7/042 180/68.5 |
| 8,336,658 B2 * | 12/2012 | Rawlinson | | B60N 2/012 180/68.5 |
| 8,397,853 B2 * | 3/2013 | Stefani | | B60L 50/64 180/68.5 |
| 8,464,817 B2 * | 6/2013 | Usami | | B60K 1/04 180/68.5 |
| 8,469,129 B2 * | 6/2013 | Mildner | | B60K 1/04 180/68.5 |
| 8,672,354 B2 * | 3/2014 | Kim | | B60K 1/04 280/783 |
| 8,733,487 B2 * | 5/2014 | Usami | | B60K 1/04 180/68.5 |
| RE44,994 E * | 7/2014 | Rawlinson | | B62D 25/2036 180/68.5 |
| 8,776,926 B2 * | 7/2014 | Auer | | B60K 1/04 180/68.5 |
| 8,789,634 B2 * | 7/2014 | Nitawaki | | B60K 1/04 180/68.5 |
| 8,833,499 B2 * | 9/2014 | Rawlinson | | F41H 7/042 180/68.5 |
| 8,835,033 B2 * | 9/2014 | Choi | | B29C 70/20 429/100 |
| 8,875,828 B2 * | 11/2014 | Rawlinson | | B60K 1/04 180/68.5 |
| 8,900,744 B2 * | 12/2014 | Loo | | H01M 2/1229 429/172 |
| 8,936,125 B2 * | 1/2015 | Nakamori | | B60K 1/04 180/68.5 |
| 8,967,312 B2 * | 3/2015 | Yanagi | | B60K 1/04 180/68.5 |
| 8,980,458 B2 * | 3/2015 | Honjo | | B60K 1/04 429/100 |
| 8,993,142 B2 * | 3/2015 | Sakai | | H01M 2/34 429/61 |
| 9,033,084 B2 * | 5/2015 | Joye | | B60K 1/04 180/68.5 |
| 9,033,085 B1 * | 5/2015 | Rawlinson | | B60L 11/1877 180/68.5 |
| 9,045,030 B2 * | 6/2015 | Rawlinson | | B60K 1/04 |
| 9,216,638 B2 * | 12/2015 | Katayama | | B60K 1/04 |
| 9,758,030 B2 * | 9/2017 | Newman | | B60L 50/66 |
| 9,761,851 B2 * | 9/2017 | Onodera | | H01M 2/1077 |
| 9,812,746 B2 * | 11/2017 | Katayama | | B60K 1/04 |
| 9,862,427 B2 * | 1/2018 | Berger | | B62D 25/20 |
| 9,987,913 B2 * | 6/2018 | Hara | | B60K 1/04 |
| 10,017,037 B2 * | 7/2018 | Newman | | B62D 25/20 |
| 10,023,069 B2 * | 7/2018 | Kobayashi | | B60L 58/21 |
| 10,062,876 B2 * | 8/2018 | Wuensche | | B60L 58/12 |
| 10,112,470 B2 * | 10/2018 | Hamilton | | B60K 1/04 |
| 10,112,563 B2 * | 10/2018 | Ashraf | | B60R 19/34 |
| 10,131,247 B2 * | 11/2018 | Berger | | B60L 58/26 |
| 10,131,381 B2 * | 11/2018 | Ashraf | | B60K 1/04 |
| 10,220,694 B2 * | 3/2019 | Mizoguchi | | B60K 1/04 |
| 10,245,955 B2 * | 4/2019 | Nakayama | | B60K 1/04 |
| 10,272,759 B2 * | 4/2019 | Sudhindra | | B60K 1/04 |
| 10,272,949 B2 * | 4/2019 | Faruque | | B60K 1/04 |
| 10,300,948 B2 * | 5/2019 | Ashraf | | B62D 21/03 |
| 2011/0240386 A1 | 10/2011 | Czinger et al. | | |
| 2012/0301765 A1 * | 11/2012 | Loo | | H01M 2/1083 429/100 |

* cited by examiner

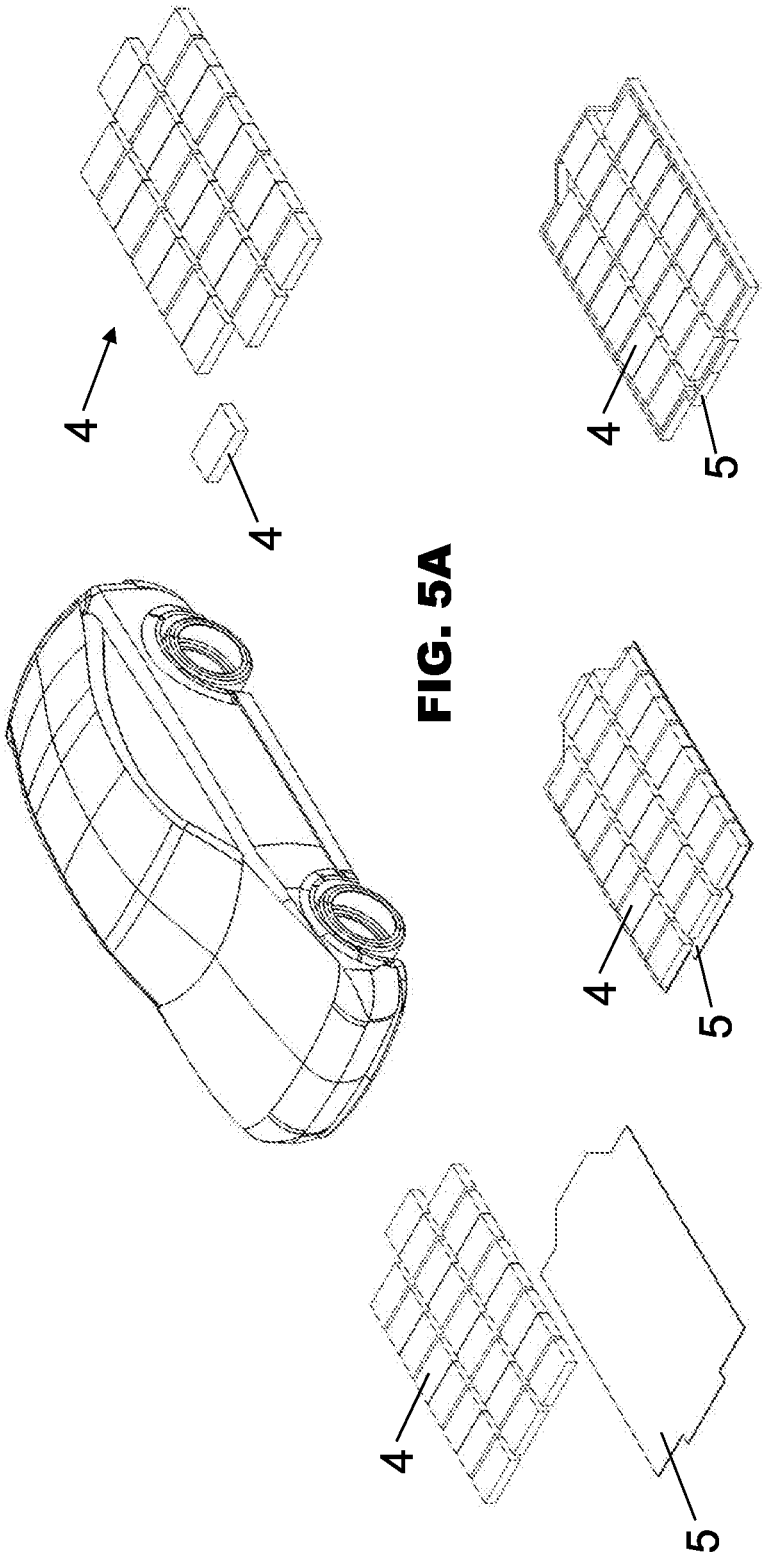

VEHICLE WITH SUPPORTING STRUCTURE

CROSS-REFERENCE TO RELATED APPLICATIONS

The present application claims priority 35 U.S.C. § 119 to European Patent Publication No. EP 18151638.6 (filed on Jan. 15, 2018), which is hereby incorporated by reference in its entirety.

TECHNICAL FIELD

Embodiments relate to a motor vehicle comprising a body having a support structure.

BACKGROUND

It is known that motor vehicles can utilise a support structure, in particular, comprising longitudinal members and crossmembers, as bodies. The support structure can then, in particular, form a so-called self-supporting body of the vehicle.

Vehicles usually use a floor plate or a floor panel, also known as a main floor, main floor plate, main floor panel, as the bottom delimitation of the vehicle. The main floor panel then usually likewise has a supporting function as a body component of the vehicle. The underside of such a main floor panel can also act as underride protection which protects the vehicle from contamination from underneath the vehicle.

In recent times, high-voltage batteries have been increasingly used as drive batteries for electric and hybrid vehicles. These high-voltage batteries are usually relatively large and must therefore be arranged in a space-saving manner in a vehicle.

SUMMARY

Embodiments relate to a motor vehicle which saves on installation space and components, and which may therefore be produced in a compact and cost-saving manner. In particular, such a motor vehicle may include a high-voltage battery to be arranged therein in a space-saving, yet still maintenance-friendly manner.

In accordance with embodiments, a motor vehicle may comprise at least one of: a body having a support structure; a high-voltage battery having a battery housing and at least one battery module in the battery housing, the battery housing being arranged on and attached to the support structure in such a way that the battery housing acts as a main floor panel; and a detachable battery cover arranged on the underside of the battery housing to acts as underride protection and also to facilitate accessibility to the at least one battery module.

In accordance with embodiments a motor vehicle may comprises at least one of: a body having a support structure, wherein the support structure or the body does not comprise a usual main floor panel.

In accordance with embodiments, the motor vehicle comprises a high-voltage battery having a battery housing and at least one battery module in the battery housing. The battery housing is arranged on and attached to the support structure in such a way that the battery housing itself acts as a main floor panel. The battery housing therefore forms a floor of the motor vehicle. The motor vehicle does not have a main floor panel which is independent of this, which also means that there are no clearances between a battery housing and a main floor. The battery housing substantially has the shape of a plate or a shallow cuboid so that it can replace the main floor. The high-voltage battery is therefore a shallow accumulator.

In accordance with embodiments, a detachable battery cover is arranged on the underside of the battery housing so that the at least one battery module is accessible via the battery cover, in particular, for purposes of maintenance and repair. In accordance with embodiments, "detachable" may mean the complete removal of the battery cover, or a swinging-open or folding-open of the battery cover so that, in any case, access to the battery modules is possible.

Since the battery cover represents the underside of the thus formed "main floor," the battery cover also acts as underride protection which protects the battery modules from damage, dirt, and debris.

In accordance with embodiments, a high-voltage battery is therefore arranged in an extremely space-saving manner in a vehicle. The battery housing moreover assumes a load-bearing function as a body component of the vehicle. In this case, battery modules and electronics within the battery housing remain easily accessible from the outside for replacement, repair etc.

In accordance with embodiments, the support structure may comprise at least one seat crossmember and/or rear seat crossmember and/or a longitudinal tunnel structure.

In accordance with embodiments, the battery housing is attached to the support structure in a permanent and load-bearing manner, for example, via screws, rivets, and/or an assembly adhesive. The battery housing remains connected to the support structure of the vehicle over the lifetime of the vehicle since it assumes part of the load path.

In accordance with embodiments, the support structure and the battery housing are preferably dip-coated separately from one another. The high-voltage battery, including battery modules, electronics, and necessary connecting cables, may be coated and assembled separately from the body of the vehicle and in parallel, i.e., simultaneously, therewith. The battery housing may be composed of metal. The surface treatment via dip-coating can serve for protection against corrosion and improve the bonding of an adhesive to the battery housing. The battery housing may be attached to the support structure via assembly adhesive and screws or rivets. The screw connection may be realised, for example, from below through the entire cross-section of the high-voltage battery, or from above.

In accordance with embodiments, at least one battery module is assembled on the battery cover and/or at least one battery module is attached to the top wall of the battery housing and/or at least one battery module is attached to a side wall of the battery housing.

In accordance with embodiments, the detachable battery cover may comprise parts of the side walls or the whole of the side walls of the battery housing, i.e., the frame of the battery housing, although the rest of the structure of the battery housing must have sufficient rigidity to prevent deformations of the vehicle during the detachment, in particular, the swinging-open or folding-open, of the battery cover.

In accordance with embodiments, the battery cover is detachably attached to the rest of the battery housing and/or to the support structure via screws, in particular, in a gas-tight manner. If the battery cover is screwed directly to the support structure, it may particularly enhance the rigidity and the crash behaviour of the body.

In accordance with embodiments, the terms "top" and "bottom" always refer to a motor vehicle in the usual position of use.

DRAWINGS

Embodiments will be illustrated by way of example in the drawings and explained in the description below.

FIGS. 5A to 5D illustrates an assembled motor vehicle and its battery modules, and also variants of the attachment of the battery modules, in accordance with embodiments.

DESCRIPTION

Figure 2:
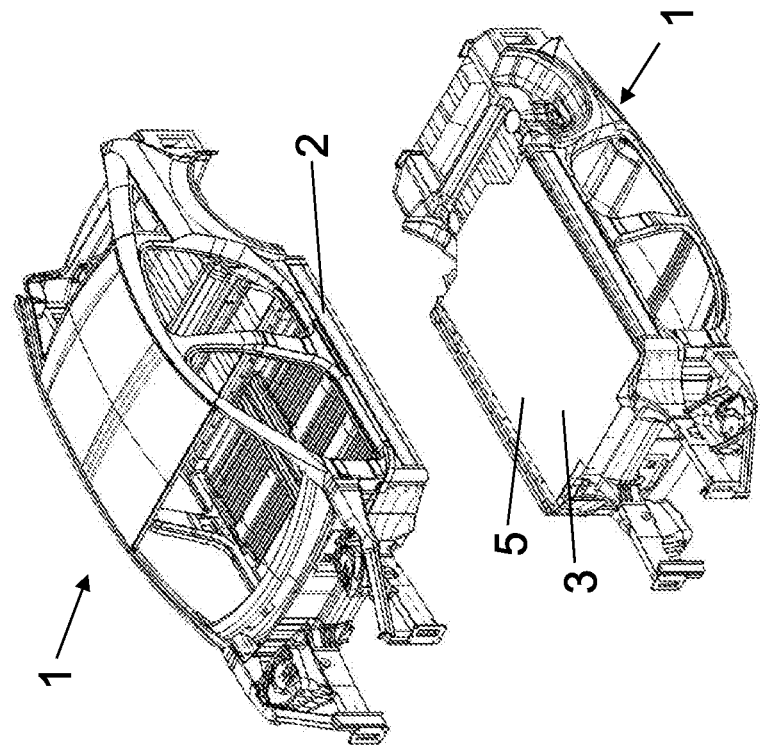
FIG. 2 illustrates a three-dimensional illustration of the high-voltage battery inserted into the body of (as seen from above) and as seen from below in the bottom.

FIGS. 1 through 4 illustrate a motor vehicle comprising a body 1 and a high-voltage battery with a battery housing 3, in accordance with embodiments. The body 1 comprises a support structure 2 having a plurality of longitudinal members and seat crossmembers and rear seat crossmembers, and a longitudinal tunnel structure. The body 1 also comprises panel components which form a roof of the motor vehicle, and pillars which connect the roof panels to the support structure 2. The body itself does not comprise a main floor panel.

The motor vehicle furthermore comprises a high-voltage battery in a battery housing 3 and a plurality of battery modules 4 arranged in the battery housing 3. The high-voltage battery may comprise a shallow accumulator. The battery housing 3 is arranged on and attached to the support structure 2 in such a way that the battery housing 3 acts as a main floor panel. The battery housing 3 therefore forms a floor of the motor vehicle. The battery housing 3 may be attached to the support structure 3 in a permanent and load-bearing manner via screws or rivets and additionally via assembly adhesive.

In accordance with embodiments, the support structure 2 and the high-voltage battery are produced independently of one another in parallel lines. The battery housing 3 may be dip-coated separately from the body 1 of the vehicle.

In accordance with embodiments, a detachable battery cover 5 is arranged on the underside of the battery housing 3 so that the battery modules 4 are accessible by detaching the battery cover 5. The battery cover 5 acts as underride protection and protects the battery modules from damage from underneath, i.e., from the road.

Figure 1:
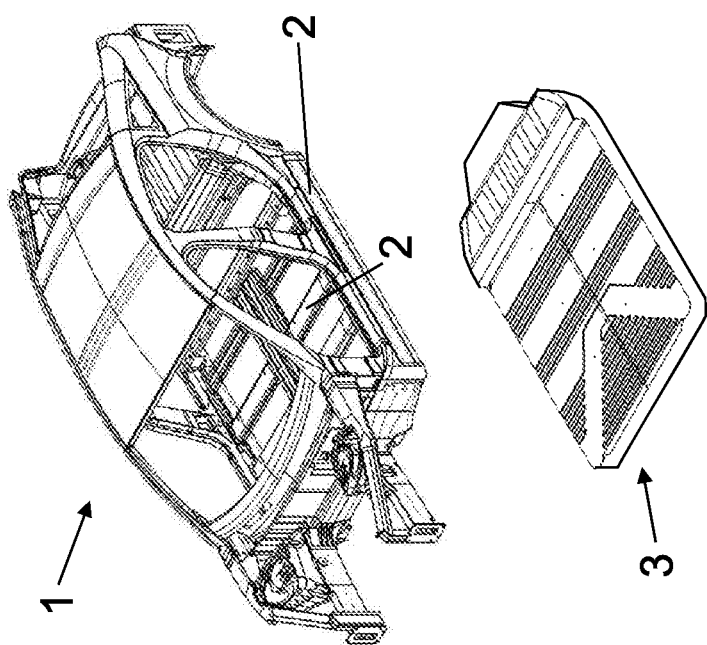
FIG. 1 illustrates a three-dimensional illustration of the body and the high-voltage battery of a motor vehicle, in accordance with embodiments.
Figure 3:
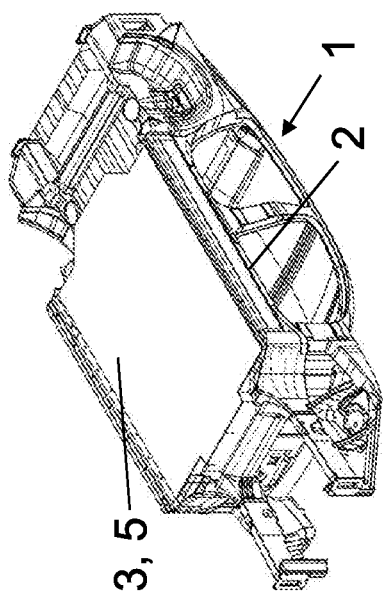
FIG. 3 illustrates the body and the high-voltage battery of FIG. 2 in the assembled state.

As illustrated in FIGS. 2 and 3, the components of FIG. 1, namely, the body 1 and the high-voltage battery in the assembled state are provided, wherein the view from above is illustrated in the top figure and the view from below, or an overturned vehicle, is illustrated in the bottom of the illustration.

Figure 4:
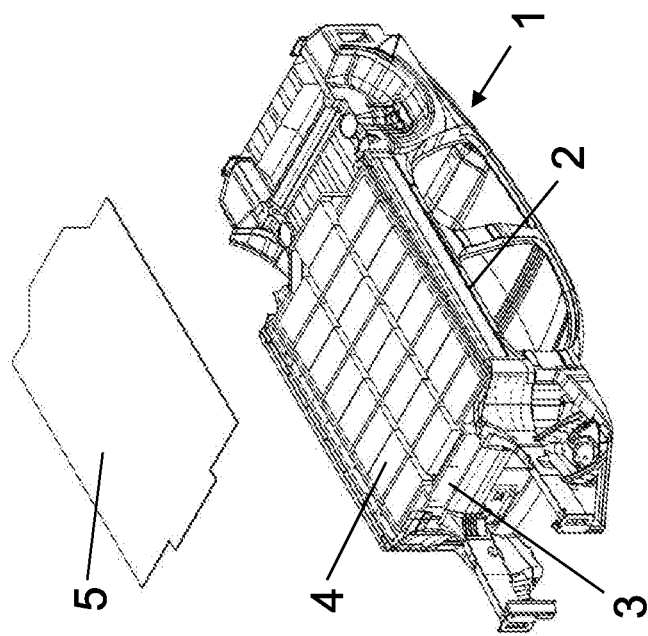
FIG. 4 illustrates the body and the high-voltage battery of FIG. 3 with the battery cover in a detached state.

As illustrated in FIG. 4, in contrast to FIG. 3, the detachment of the battery cover 5 from the rest of the battery housing 3 is provided. Between the battery cover 5 and the remainder of the walls of the battery housing 3, the battery modules are arranged and attached in a regular distribution in two dimensions, in the longitudinal and transverse direction.

As illustrated in FIGS. 5A to 5D, the battery modules 4 is a assembled in the illustrated motor vehicle. The attachment of the battery modules 4 may be realised, inter alia, in the variants of FIGS. 5B to 5D. In this case, at the time of attaching the battery cover 5 to the remainder of the battery housing 3 and/or to the support structure 2 during vehicle manufacture, the battery modules 4 are not yet assembled on the battery cover 5 (FIG. 5B) or are already pre-assembled on the battery cover 5 (FIG. 5C) or are already pre-assembled on the battery cover 5 which also comprises a frame, i.e., side walls of the battery housing 3. The battery modules 4 may already be pre-assembled in this manner in or on the battery housing 3 (FIG. 5C) or on other walls of the battery housing 3 at the time of attaching the battery cover 5.

The embodiment described with reference to FIG. 5B, in which the battery modules 4 are not yet assembled at the time of attaching the battery cover 5, is then especially advantageous if the attachment of the battery cover 5 to the remainder of the battery housing 3 does not yet include closing the battery cover, but instead constitutes connecting the cover to the battery housing, for example, via hinges or similar mechanisms, so that the battery cover can still be simply folded open and shut or simply opened in some other manner or is even still open after the attaching procedure.

After attaching the battery cover, depending on the variant embodiment, an additional procedure for sealing the battery by closing the battery cover 5, for example, in conjunction with a subsequent locking or screw-connection of the battery cover 5 to the remainder of the battery housing 3 and/or to the support structure 2, may be optionally realised.

Figure 6:
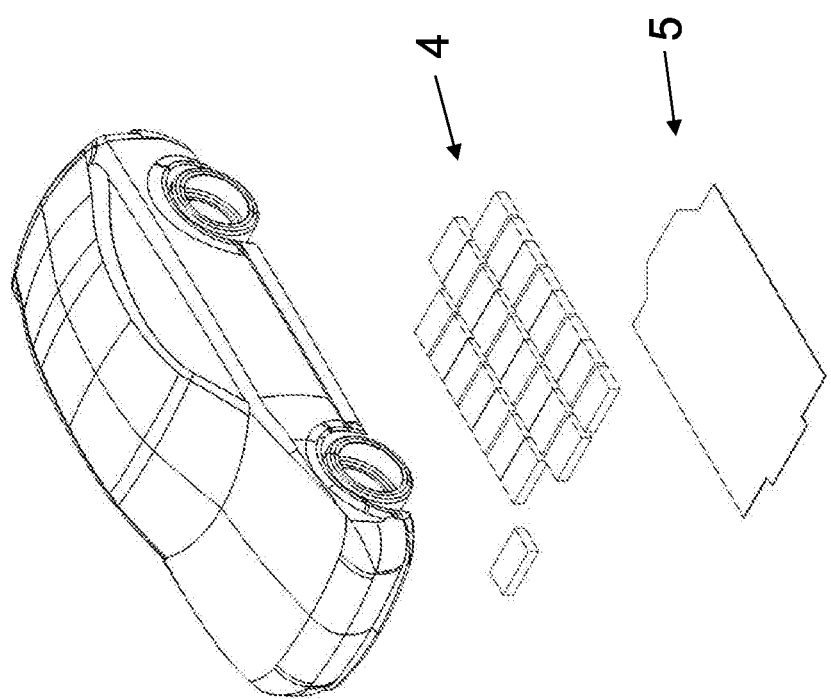
FIG. 6 illustrates the repair of a motor vehicle, in accordance with embodiments.

As illustrated in FIG. 6, repair or maintenance of a motor vehicle may be realised, namely, by detaching the battery cover 5 so that the battery modules 4 may be removed, and repaired or replaced.

The terms "coupled," "connected" "fastened" or "attached" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1 Body
2 Support structure

3 Battery housing
4 Battery module
5 Battery cover

What is claimed is:

1. A motor vehicle, comprising:
a body having a support structure having a dip-coating;
a high-voltage battery having a battery housing having a dip-coating, the battery housing including a battery housing frame, at least one battery module arranged in the battery housing, the battery housing being arranged on and attached to the support structure, the battery housing having a shape of a cuboid to serve as a main floor panel, and a battery housing cover detachably attached to the battery housing frame on the underside thereof as underride protection and facilitate access to the at least one battery module, wherein the support structure and the battery housing are dip-coated separately from one another.

2. The motor vehicle of claim 1, wherein the support structure comprises at least one seat crossmember, a rear seat crossmember, and a longitudinal tunnel structure.

3. The motor vehicle of claim 1, wherein the support structure comprises at least one seat crossmember, and/or at least one rear seat crossmember, and/or at least one longitudinal tunnel structure.

4. The motor vehicle of claim 1, wherein the support structure comprises at least one seat crossmember.

5. The motor vehicle of claim 1, wherein the support structure comprises at least one rear seat crossmember.

6. The motor vehicle of claim 1, wherein the support structure comprises at least one longitudinal tunnel structure.

7. The motor vehicle of claim 1, wherein the battery housing is attached to the support structure in a permanent and load-bearing manner via screws, rivets, and an assembly adhesive.

8. The motor vehicle of claim 1, wherein the battery housing is attached to the support structure in a permanent and load-bearing manner via screws.

9. The motor vehicle of claim 1, wherein the battery housing is attached to the support structure in a permanent and load-bearing manner via rivets.

10. The motor vehicle of claim 1, wherein the battery housing is attached to the support structure in a permanent and load-bearing manner via an assembly adhesive.

11. The motor vehicle of claim 1, wherein:
at least one battery module is assembled on the battery housing cover;
at least one battery module is attached to the top wall of the battery housing frame; and
at least one battery module is attached to a side wall of the battery housing frame.

12. The motor vehicle of claim 1, wherein at least one battery module is assembled on the battery housing cover.

13. The motor vehicle of claim 1, wherein at least one battery module is attached to the top wall of the battery housing frame.

14. The motor vehicle of claim 1, wherein at least one battery module is attached to a side wall of the battery housing frame.

15. A motor vehicle, comprising:
a high-voltage battery having at least one battery module;
a battery housing, having a dip-coating, to serve as a main floor panel of the motor vehicle, the battery housing including a battery housing frame which is to receive therein the at least one battery module, wherein the battery housing is dip-coated separately from a support structure of the motor vehicle, and a battery housing cover detachably attached to the battery housing frame as underride protection and facilitate access to the at least one battery module, wherein the support structure and the battery housing are dip-coated separately from one another.

16. A battery assembly for a motor vehicle that includes a body having a support structure with a dip-coating, the battery assembly comprising:
a high-voltage battery having at least one battery module;
a battery housing, having a dip-coating, to serve as a main floor panel of the motor vehicle, the battery housing including a battery housing frame which is to receive therein the at least one battery module, and a battery housing cover detachably attached to the battery housing frame in a gas-tight manner as underride protection and facilitate access to the at least one battery module, wherein the support structure and the battery housing are dip-coated separately from one another.

* * * * *